(No Model.)
S. SMITH.
CHURN.
No. 339,944. Patented Apr. 13, 1886.
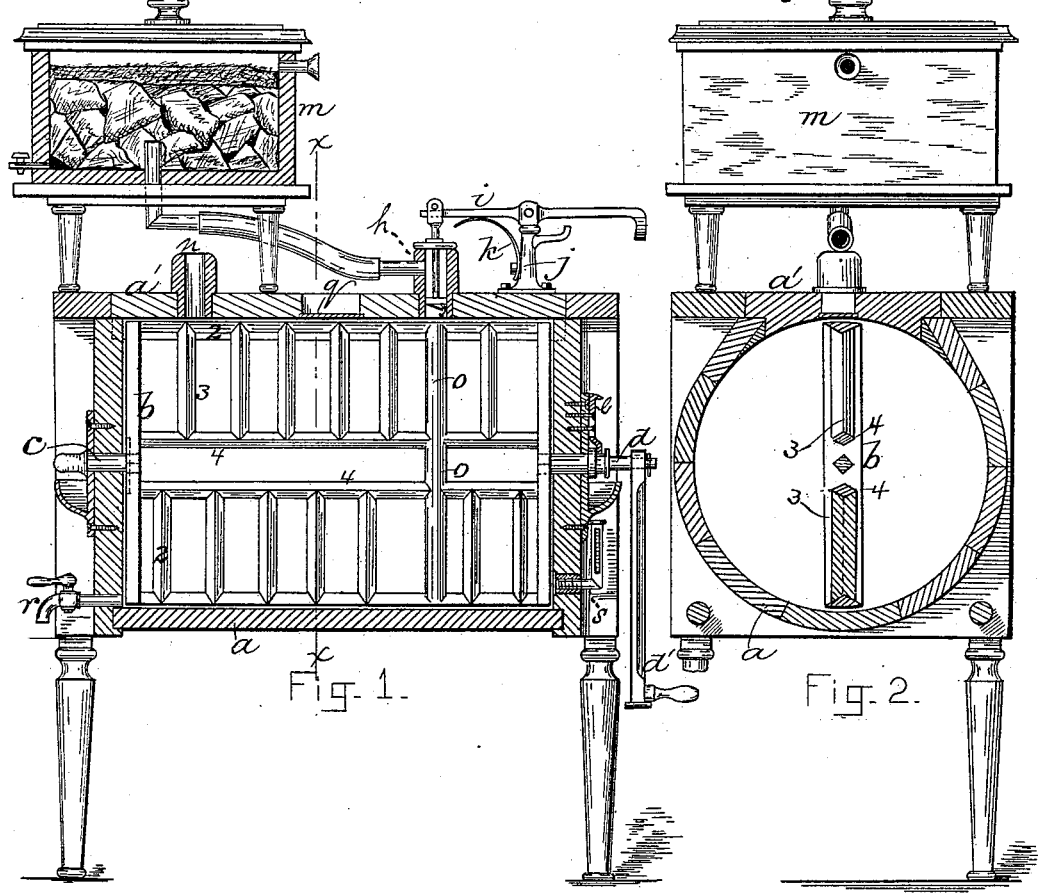
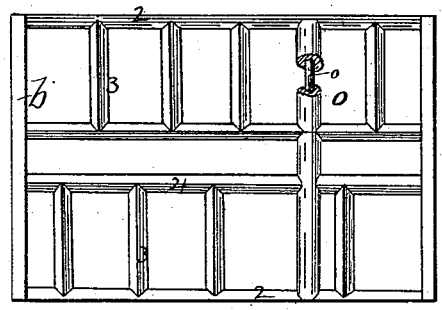
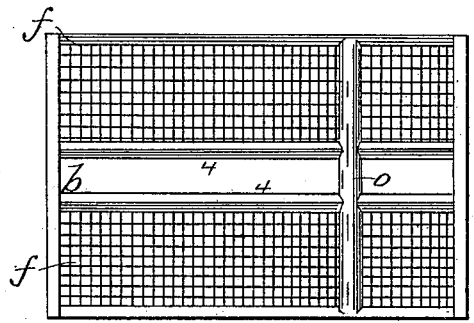
WITNESSES:
C. S. Gooding.
Horace Brown.
INVENTOR:
Sidney Smith
by Wight & Brown
Attys.

UNITED STATES PATENT OFFICE.

SIDNEY SMITH, OF CAMBRIDGE, MASSACHUSETTS.

CHURN.

SPECIFICATION forming part of Letters Patent No. 339,944, dated April 13, 1886.

Application filed May 24, 1884. Serial No. 132,668. (No model.)

*To all whom it may concern:*

Be it known that I, SIDNEY SMITH, of Cambridge, in the county of Middlesex and State of Massachusetts, have invented certain Improvements in Churns, of which the following is a specification.

The object of this invention is to provide certain improvements in churns for making butter from milk or cream in a manner to produce the largest possible amount of butter from a given quantity of milk or cream in the least possible space of time with the smallest expenditure of power, to remove all deteriorating gases and impurities from the cream or milk, and at the same time to preserve in the butter the natural granulated texture of the cream or milk which renders the butter most desirable and gives to it those qualities which alone can maintain it in the best condition and flavor for the longest time.

Figure 1 represents a longitudinal section of a churn embodying my invention. Fig. 2 represents a section on line $x\ x$, Fig. 1. Figs. 3 and 4 represent detached views of differently-constructed dashers.

In the drawings, $a$ represents the body of the churn, which is of cylindrical form and has a cover, $a'$, of sufficient length to permit the insertion and removal of the dash, as hereinafter described. The dash $b$ is composed of a rectangular marginal frame, 2, bars 4, parallel with the side bars, 2, and suitable cross-bars, 3, supported thereby, as hereinafter described. The frame of the dash is in close proximity to, but does not touch or scrape, the inner cylindrical surface and ends of the churn.

The bars or pieces that compose the dash are preferably angular in cross-section, as shown in Fig. 2, each bar presenting acute angles to the cream which it moves through; or said bars may be oval in cross-section. The bars are arranged to strike the cream edgewise as the dash rotates, and each bar is formed so that it presents the minimum of supporting-surface as it rises from the cream. The bars therefore allow the cream to slip off and remain with the body from which the bars emerge. The churn should be filled only about half-full, or less, so that the bars may strike the surface positively, instead of wallowing through the cream. The dash has no central shaft, but is open at the center, and is mounted upon a pivot, $c$, inserted in one end of the churn-body, and a crank, $d$, inserted in the other end. The dash is detachable from said pivot and crank-shaft, so that it can be readily removed and inserted. To this end the crank-shaft is made longitudinally movable, and is provided with a squared end, which fits a squared socket in the dash-frame. A sliding catch, $e$, engages with a groove between two collars on the shaft $d$, and prevents said shaft from moving endwise.

When it is desired to remove the dash, the catch $e$ is disengaged from the shaft $d$ and the latter is withdrawn from the dash, so that the dash can be slipped off from the pivot $c$ and removed from the churn.

Fig. 3 shows the dash removed from the churn, and differing from that shown in Fig. 1 only by the number of bars which compose it.

Fig. 4 shows the dash composed of the marginal frame, as above, and two reticulated parts, $f\ f$, at opposite sides of the open center. The reticulated parts may be composed of wire or other suitable material detachably secured to the bars, with openings of any desired size.

The open central portion of the dash enables all parts of the dash to act positively on the milk or cream. Heretofore in most rotary dashers the shaft or axis has extended through the center of the dash and formed a non-beating or practically inoperative dead-surface, to which the cream will adhere without being churned, the result being streaked butter. This is prevented by the open center of my improved dash.

$h$ represents an air-pump arranged to force air through the cover $a'$ into the churn. The piston of said pump is operated by a lever, $i$, pivoted to a standard, $j$, attached to the cover of the churn and provided with a spring, $k$, which normally raises the end of the lever to which the piston is connected. The other end of said lever projects over the dash-crank $d'$, and is raised by the latter once in each rotation of the crank, the piston of the air-pump being thus depressed and caused to force air into the churn. The air supplied to the churn by the pump may be drawn through a box, $m$, which may contain ice in hot weather and a warming agent in cold weather, for the purpose of insuring the proper temperature of the air. The box $m$ is provided with one or more strainers of textile fabric or cotton-wool in a loose condition, or other suitable material, for the purpose of arresting dust, impurities, and germs contained in the air. A vent, $n$, is provided for the escape of air and gases from the churn. The dash has one or more air-tubes, $o$, extending across it and adapted to coincide with and receive air from the orifice, through which air is forced into the churn by the pump, thus diffusing the air through the entirety of the churn.

$q$ represents a light of glass inserted in the cover of the churn to enable the condition of the interior to be inspected.

$r$ represents a passage for the escape of buttermilk from the churn.

$s$ represents a cup, which is inserted in one end of the churn, its inner surface being flush with the inner surface of the churn, and therefore in contact with the cream therein. Said cup projects outwardly and is adapted to contain oil or other liquid which will be affected by temperature of the interior of the churn. The outer end of the cup is open and is adapted to receive a thermometer, which may be screwed into the end of the cup to indicate the temperature of the oil, and therefore of the cream or milk, to which the oil is in close proximity.

Owing to the close approach of the dash to all parts of the interior surface of the churn, it is not practicable to insert a thermometer into the churn; hence the above-described device is adopted.

I claim—

1. A cylindrical churn having a pump, means for operating the same, and a suitable opening to conduct air from the pump into the churn, combined with a dash having a hollow cross-bar adapted to coincide with said opening and conduct the air, as described, the churn being provided with a suitable opening for the escape of the gases generated during the process of churning.

2. In combination with a cylindrical churn, a rotating dasher having marginal frames 2, with sharp edges, and having an open center, and with cross-bars 3, with sharp edges, extending from the side bars, 2, to sharp-edged bars 4, parallel with the side bars, as set forth.

In testimony whereof I have signed my name to this specification, in the presence of two subscribing witnesses, this 21st day of May, 1884.

SIDNEY SMITH.

Witnesses:
C. F. BROWN,
H. BROWN.